United States Patent
Li et al.

(10) Patent No.: US 8,343,319 B1
(45) Date of Patent: Jan. 1, 2013

(54) METHOD AND SYSTEM FOR PROVIDING AN IMPROVED HARD BIAS STRUCTURE

(75) Inventors: Guanxiong Li, Fremont, CA (US);
Xiaohai Xiang, Danville, CA (US);
Ming Mao, Pleasanton, CA (US);
Mahendra Pakala, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 876 days.

(21) Appl. No.: 12/238,156

(22) Filed: Sep. 25, 2008

(51) Int. Cl.
*C23C 14/34* (2006.01)

(52) U.S. Cl. .................. 204/192.34; 204/192.2; 216/41; 216/66

(58) Field of Classification Search ............... 204/192.2, 204/192.34; 216/41, 66
See application file for complete search history.

(56) References Cited

U.S. PATENT DOCUMENTS

| | | | |
|---|---|---|---|
| 5,381,291 A | 1/1995 | Madsen et al. | |
| 5,483,402 A | 1/1996 | Batra | |
| 5,682,284 A | 10/1997 | George | |
| 5,715,120 A | 2/1998 | Gill | |
| 5,739,988 A | 4/1998 | Gill | |
| 5,748,415 A | 5/1998 | Christner et al. | |
| 6,150,045 A | 11/2000 | Saito et al. | |
| 6,426,853 B1 | 7/2002 | Sakai et al. | |
| 6,735,062 B1 | 5/2004 | Pokhil et al. | |
| 7,194,796 B2 | 3/2007 | Lee et al. | |
| 7,211,339 B1 * | 5/2007 | Seagle et al. | 428/815 |
| 7,212,384 B1 | 5/2007 | Stoev et al. | |
| 7,268,985 B2 | 9/2007 | Freitag et al. | |
| 7,369,371 B2 | 5/2008 | Freitag et al. | |
| 7,369,374 B2 | 5/2008 | Gill et al. | |
| 2006/0023377 A1 | 2/2006 | Cyrille et al. | |
| 2007/0081279 A1 * | 4/2007 | Hong et al. | 360/324.1 |
| 2008/0002307 A1 | 1/2008 | Akie | |

* cited by examiner

*Primary Examiner* — Rodney McDonald

(57) ABSTRACT

A method and system for providing a magnetic transducer is described. The method and system define a magnetoresistive sensor in a track width direction, provide hard bias material(s) adjacent to the sensor in the track width direction, and provide sacrificial capping layer(s) on a portion of the hard bias material(s). The sacrificial capping layer(s) have a first height in a stripe height direction. The method and system also provide a mask for defining a stripe height of the sensor. The mask covers at least part of the sensor and has a second height in the stripe height direction. The second height is less than the first height. The method and system define the stripe height of the sensor while the mask covers the sensor. The sacrificial capping layer(s) are configured to prevent removal of the portion of the hard bias material(s) while the stripe height is defined.

9 Claims, 6 Drawing Sheets

METHOD AND SYSTEM FOR PROVIDING AN IMPROVED HARD BIAS STRUCTURE

BACKGROUND

FIG. 1 depicts a conventional method 10 for forming a read transducer. The conventional method 10 commences after structures in the conventional read transducer have been formed. For example, shield(s), write transducer(s) or other structures may have been fabricated. A conventional magnetoresistive sensor that is defined in the track width direction and conventional hard bias structures are provided, via step 12. Step 12 includes formation of the conventional magnetoresistive stack. A conventional antiferromagnetic (AFM) layer, a conventional pinned layer, a conventional nonmagnetic spacer layer, and a conventional free layer may have been deposited. In addition, the layers may have been masked and ion milled in the track width direction to define the sensor in this direction using step 12. The track width direction is parallel to the air-bearing surface (ABS) and generally perpendicular to the layers of the magnetoresistive stack. Further, a thin insulating layer on the sides of the conventional magnetoresistive sensor in the track with direction may be provided. Further, conventional hard bias materials are deposited in step 12.

A mask that covers the conventional hard bias structure and the conventional magnetoresistive sensor is provided, via step 14. The mask is used to define a stripe height of the conventional magnetoresistive sensor. The stripe height direction is generally perpendicular to the ABS. In the region near the magnetoresistive sensor, the mask terminates substantially the same distance from the ABS across the magnetoresistive sensor and the hard bias material(s).

The magnetoresistive sensor and hard bias structure are milled with the mask in place, via step 16. Fabrication of the magnetic transducer may then be completed. For example, other structures such as shield(s) and/or write transducers may be provided. In addition, lapping or other processing may change the final stripe height of the magnetoresistive sensor.

FIG. 2 depicts a perspective view of a conventional magnetic read transducer 20 used in reading a media (not shown) and fabricated using the method 10. For clarity, only a portion of the conventional read transducer 20 is shown. Referring to FIGS. 1-2 the conventional read transducer 20 is shown after completion of step 16 of the conventional method 10. The conventional magnetic transducer 20 is formed on substrate 22 and includes conventional magnetoresistive sensor 24 and conventional hard bias structure 26A and 26B. The track width, TW, is defined in step 12. The stripe height, SH, is determined in step 16 and by the mask provided in step 14. The stripe height determined indicates not only the position at which the conventional magnetoresistive sensor 24 terminates, but also the location at which the hard bias structures 26A and 26B substantially terminate.

Although the conventional read transducer 20 formed using the method 10 functions, the trend in hard disk drives is toward higher densities. At higher densities, such as greater than or equal to four hundred gigabits per square inch, the track width TW is small. At such densities, the signal-to-noise ratio is desired to be enhanced. An improvement in the signal-to-noise ratio may be achieved by improved biasing of the conventional magnetoresistive sensor 24. Consequently, a mechanism for improving the conventional hard bias structures 26A and 26B is desired.

FIG. 3 depicts another conventional method 30 for fabricating a conventional read transducer. The conventional method 30 commences after structures in the conventional read transducer have been formed. For example, shield(s), write transducer(s) or other structures may have been fabricated. The magnetoresistive stack is provided, via step 32. Step 32 typically includes blanket depositing an AFM layer, a pinned layer, a nonmagnetic spacer layer, and a free layer, as described above. The magnetoresistive stack is masked and milled to define the stripe height, via step 34. After the milling in step 34, alumina is typically used to refill the region from which the magnetoresistive sensor stack was removed. The magnetoresistive sensor is defined in the track width direction, via step 36. Thus, the stripe height and track width of the conventional magnetoresistive sensor are defined in steps 34 and 36. The conventional hard bias structure(s) are also provided, via step 38.

Although the conventional method 30 can be used to fabricate a conventional read transducer, there are drawbacks. However, in the step 36 of defining the magnetoresistive sensor in the track width direction, the alumina refill mills at a different rate than the magnetoresistive sensor. Consequently, the topology on which the hard bias structure is deposited is not flat. This topology is transferred to the conventional hard bias structure, which gives rise to magnetic instabilities in the conventional hard bias structure. Therefore the conventional hard bias structure's ability to adequately bias the conventional magnetoresistive sensor may still be compromised. Thus, the signal-to-noise ratio of the conventional read transducer may be adversely affected.

Accordingly, what is needed is a system and method for improving the signal-to-noise ratio of the magnetic transducer.

BRIEF SUMMARY OF THE INVENTION

A method and system for providing a magnetic transducer is described. The method and system include defining a magnetoresistive sensor in a track width direction and providing hard bias material(s). A first portion of the hard bias material(s) is substantially adjacent to the magnetoresistive sensor in the track width direction. The method and system also include providing at least one sacrificial capping layer on a second portion of the hard bias material(s). The sacrificial capping layer(s) have a first height in a stripe height direction substantially perpendicular to the track width direction. The method and system also include providing a mask for defining a stripe height of the magnetoresistive sensor in the stripe height direction. The mask covers at least a portion of the magnetoresistive sensor and has a second height in the stripe height direction. The second height is less than the first height. The method and system also include defining the stripe height of the magnetoresistive sensor while the mask covers the at least the portion of the magnetoresistive sensor. The sacrificial capping layer(s) are configured to prevent removal of the second portion of the hard bias material(s) during the step of defining the stripe height.

DETAILED DESCRIPTION OF THE PREFERRED EMBODIMENTS

Figure 1:
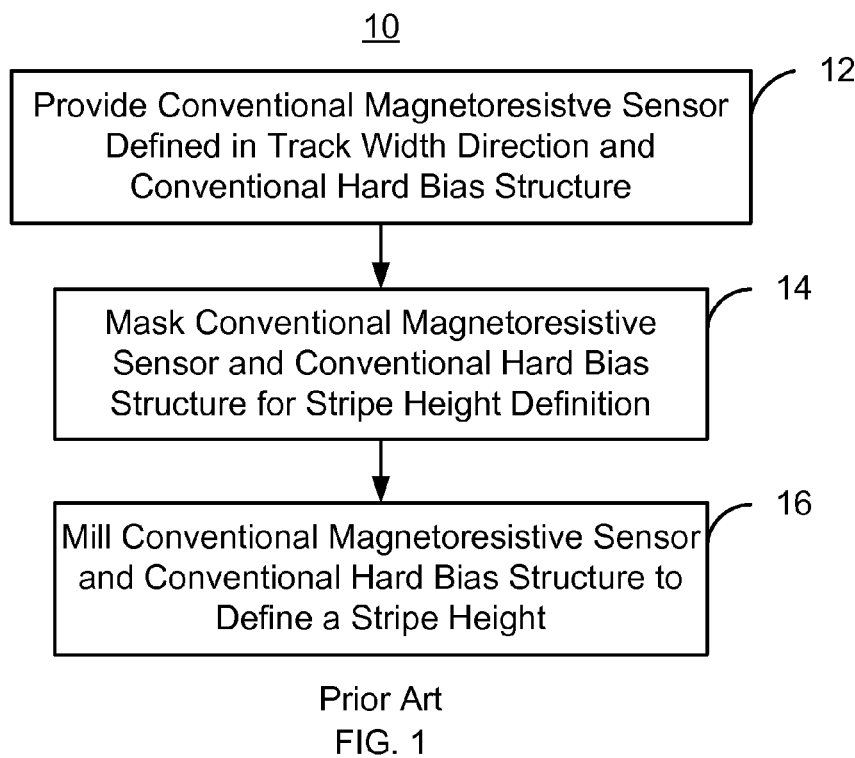
FIG. 1 is a flow chart depicting a conventional method for fabricating a read transducer.
Figure 2:
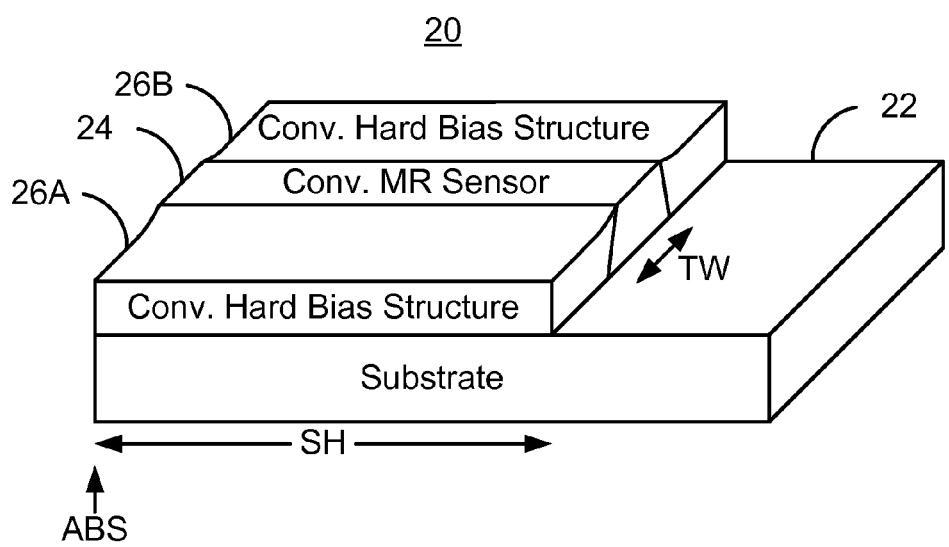
FIG. 2 depicts conventional read transducer.
Figure 3:
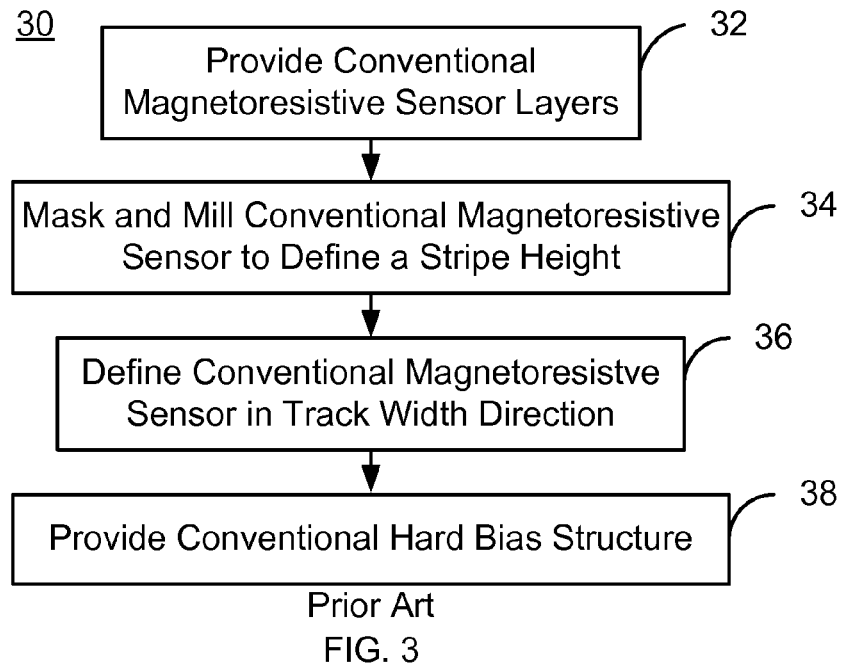
FIG. 3 is a flow chart depicting another conventional method for fabricating a read transducer.
Figure 4:
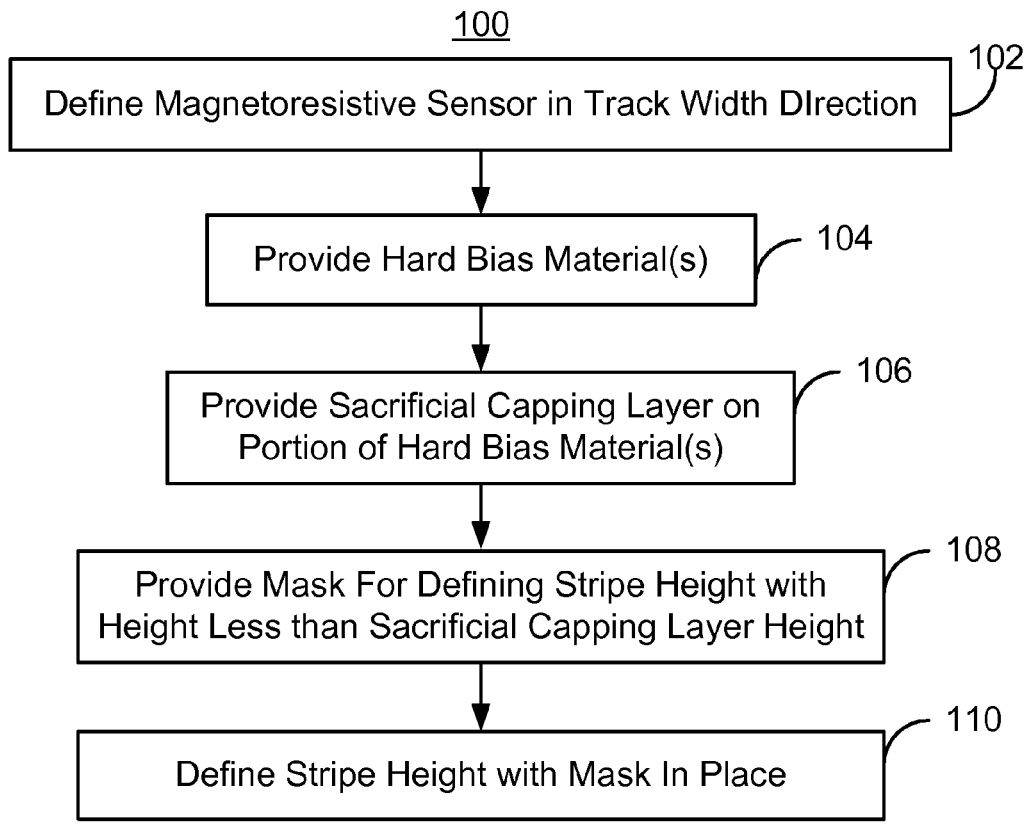
FIG. 4 is a flow chart of an exemplary embodiment of a method for fabricating a magnetic transducer.

FIG. 4 is a flow chart of an exemplary embodiment of a method 100 for fabricating a magnetic transducer, particularly a read transducer. For simplicity, some steps may be omitted or combined with other steps. The method 100 also may commence after formation of other structures of the read transducer. The method 100 is also described in the context of providing a single magnetic transducer. However, the method 100 may be used to fabricate multiple structures at substantially the same time. The method 100 is also described in the context of particular layers. However, in some embodiments, such layers may include sub-layer(s). The method 100 also commences after the magnetoresistive stack has been provided, preferably by blanket depositing the layers. For example, an AFM layer, a pinned layer, a nonmagnetic spacer layer, and a free layer may have been deposited. The pinned layer may be a synthetic antiferromagnetic (SAF) layer including magnetically coupled ferromagnetic sublayers interleaved with nonmagnetic layer(s). The nonmagnetic spacer layer may be an insulating barrier layer, a conductive layer, or another similar layer. The free layer is magnetic and has a magnetization that may change in response to the field of a media (not shown). The free layer may be a multilayer.

The magnetoresistive sensor is defined in the track width direction, via step 102. The track width direction is parallel to the ABS and generally perpendicular to the layers of the magnetoresistive stack. However, the magnetoresistive sensor still extends in the stripe height direction, perpendicular to the ABS, farther than desired in the final device.

At least one hard bias material is provided, via step 104. In one embodiment, a first portion of the hard bias material(s) is substantially adjacent to the magnetoresistive sensor in the track width direction. Step 104 may include providing a thin insulating layer on the sides of the magnetoresistive sensor that were defined in step 102. In such an embodiment, the portion of the insulating layer on the sides of the magnetoresistive sensor may be sandwiched between the hard bias material(s) and the magnetoresistive sensor. Hard bias materials provided in step 104 may include material(s) such as CoPt.

Sacrificial capping layer(s) are provided on at least a portion of the hard bias material(s), via step 106. The sacrificial capping layer(s) may be provided directly on the hard bias material(s) or in proximity to the surface of the hard bias material(s). The sacrificial capping layer(s) provided in step 106 extend a distance in the stripe height direction, perpendicular to the ABS. The distance the sacrificial capping layer extends in the stripe height direction is termed a first height. This first height may, but need not, extend as far as the hard bias material(s). Step 106 includes depositing materials such as one or more of diamond-like carbon (DLC), aluminum oxide, and silicon carbide. The sacrificial capping layer(s) are configured such that the hard bias material(s) are not completely removed in a subsequent step of defining the stripe height (described below) of the magnetoresistive sensor. In one such embodiment, the sacrificial capping layer(s) are configured such that substantially none of the hard bias material(s) are removed during the step of defining the stripe height. In another embodiment, some, but not all, of the hard bias material(s) might be removed during the step of defining the stripe height. Furthermore, the sacrificial capping layer(s) have a thickness and a removal rate in the step of defining the stripe height. In one embodiment, at least the thickness of material provided in step 106 is set based on the removal rate such that the hard bias materials are not removed during the step of defining the stripe height. In one embodiment, an additional capping layer may be provided on the sacrificial capping layer. This capping layer may also be sacrificial in nature and may be metallic.

A mask for defining the magnetoresistive sensor in the stripe height direction is provided, via step 108. Thus, the mask is used to define the stripe height of the magnetoresistive sensor. The mask covers a portion of the magnetoresistive sensor. The mask may also cover a portion of the hard bias material(s). In one embodiment, the mask extends in the stripe height direction a distance, termed the second height. The second height is less than the first height of the sacrificial capping layer(s). The sacrificial capping layer(s) thus extend farther in the stripe height direction than the mask.

The stripe height of the magnetoresistive sensor is defined while the mask covers at least part of the magnetoresistive sensor, via step 110. In one embodiment, step 110 includes ion milling the magnetic transducer at an angle, for example at least five and not more than twenty degrees. In one embodiment, the angle is at least nine and not more than fifteen degrees. Consequently, the stripe height of the magnetoresistive sensor is determined in step 110. Note, however, that this stripe height may differ from the final stripe height of the magnetoresistive sensor in the finished magnetic transducer. The final stripe height may be shorter if processes, such as lapping of the magnetoresistive sensor, are carried out. Thus, once step 110 is finished, fabrication of the magnetic transducer may then be completed.

As discussed above, the sacrificial capping layer(s) are configured to prevent removal of the second portion of the at least one hard bias material during step 110. In one embodiment, the magnetoresistive sensor has a first thickness and the sacrificial capping layer(s) have a second thickness. In such an embodiment, the magnetoresistive sensor has a first removal rate in step 110, while the sacrificial capping layer(s) have a second removal rate in step 110. In such an embodiment, the second thickness may be greater than or equal to the first thickness multiplied by the first removal rate and divided by the second removal rate. In one embodiment, the second removal rate of the sacrificial capping layer(s) is less than the removal rate for the magnetoresistive sensor. In such an embodiment, the thickness of the sacrificial capping layer(s) may be less than the thickness of the magnetoresistive sensor. For example, in one embodiment, it may be estimated that the magnetoresistive sensor has a thickness of not more than three hundred and fifty Angstroms and has a removal rate similar to that of Ru. If aluminum oxide is used as the sacrificial capping layer(s), then the removal rate of the sacrificial capping layers is approximately one-third that of the magnetoresistive sensor. Consequently, approximately one hundred twenty Angstroms of the sacrificial capping layer may be provided in step 106 and substantially consumed in step 110. However, the underlying hard bias material(s) remain.

Because of the presence of the sacrificial capping layers, the hard bias material(s) may extend farther in the stripe height direction than the magnetoresistive sensor. Where covered by the sacrificial capping layer(s), at least a portion of the hard bias material(s) remain after step 110. The remaining hard bias material(s) extend at least to the second height of the sacrificial capping layer(s). In contrast, the magnetoresistive sensor only extends to the first height of the mask. Because the hard bias material(s) extend farther than the magnetoresistive sensor, the biasing of the magnetoresistive sensor may be improved. Signal-to-noise ratio for the magnetoresistive sensor may, therefore, be improved. In addition, the changes to the fabrication methods may be simplified using the method 100. Consequently, improved signal-to-noise ratio may be improved without adversely affecting the efficiency of processing.

Figure 5:
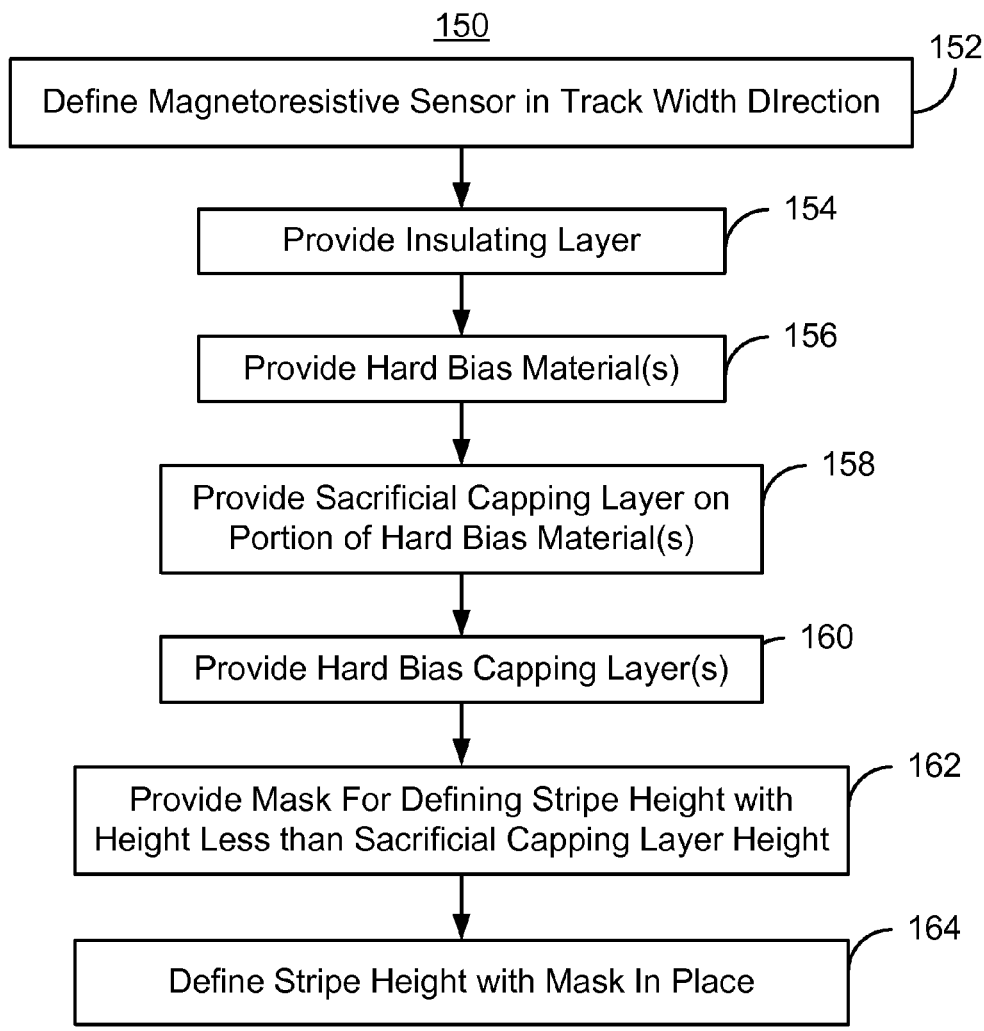
FIG. 5 is a flow chart of another exemplary embodiment of a method for fabricating a magnetic transducer.

FIG. 5 is a flow chart of another exemplary embodiment of a method 150 for fabricating a magnetic transducer. For simplicity, some steps may be omitted or combined with other steps. The method 100 also may commence after formation of other structures of the read transducer. FIGS. 6-13 depict an exemplary embodiment of a magnetic recording transducer 200 during fabrication. The magnetic transducer 200 is a read transducer may be part of a merged head that also includes a write transducer (not shown) and resides on a slider (not shown) of a disk drive. The magnetic transducer 200 may also include other structures, such as hard bias structures for the sensor that are not shown. For clarity, the magnetic recording transducer 200 is not drawn to scale.

Referring to FIGS. 5-13, the method 150 is described in the context of a single magnetic transducer 200. However, the method 150 may be used to fabricate multiple structures at substantially the same time. The method 150 and transducer 200 are also described in the context of particular layers. However, in some embodiments, such layers may include sub-layer(s). The method 150 also commences after the magnetoresistive stack has been provided, preferably by blanket depositing the layers. For example, an AFM layer, a pinned layer, a nonmagnetic spacer layer, and a free layer may have been deposited. The pinned layer may be a SAF. The nonmagnetic spacer layer may be an insulating barrier layer, a conductive layer, or another similar layer. The free layer is magnetic and has a magnetization that may change in response to the field of a media (not shown). The free layer may also be a multilayer. However, for simplicity, individual layers of the magnetoresistive sensor are not depicted in FIGS. 6-13.

Figure 6:
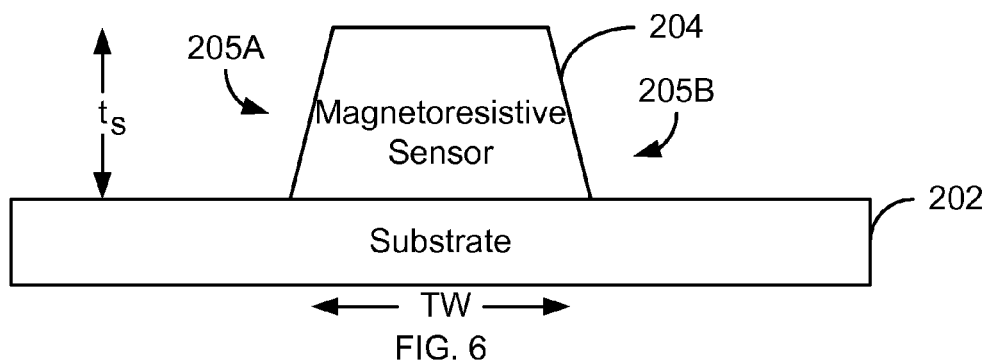
FIGS. 6-13 depict an exemplary embodiment of a magnetic recording transducer during fabrication.

The magnetoresistive sensor is defined in the track width direction, via step 152. The track width direction is parallel to the ABS and generally perpendicular to the layers of the magnetoresistive stack. However, the magnetoresistive sensor still extends in the stripe height direction, perpendicular to the ABS, farther than desired in the final device. FIG. 6 depicts the magnetic transducer 200 after step 152 is performed and as seen from an ABS location. The ABS location is the location at which the ABS will be positioned in the final device. In addition, mask(s) that may be used in defining the track width are not shown. The magnetic transducer 200 is formed on a substrate 202. The magnetoresistive sensor 204 is defined in the track width direction and thus has track width TW and sides 205A and 205B. In addition, the thickness of the magnetoresistive sensor is $t_s$.

Figure 7:
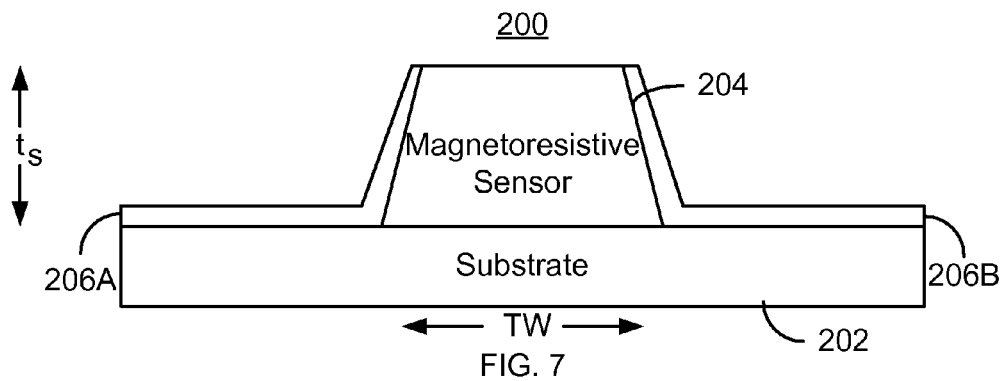

An insulating layer is provided, via step 154. In one embodiment, step 154 includes depositing an aluminum oxide layer. FIG. 7 depicts the magnetic transducer 200 as seen from the ABS location after step 154 is performed. Thus, insulating layer 206A and 206B has been formed. A portion of the insulating layer 206A/206B covers the sides 205A and 205B of the magnetoresistive sensor 204, while another portion of the insulating layer 206A/206B may reside on the substrate 202.

Figure 8:
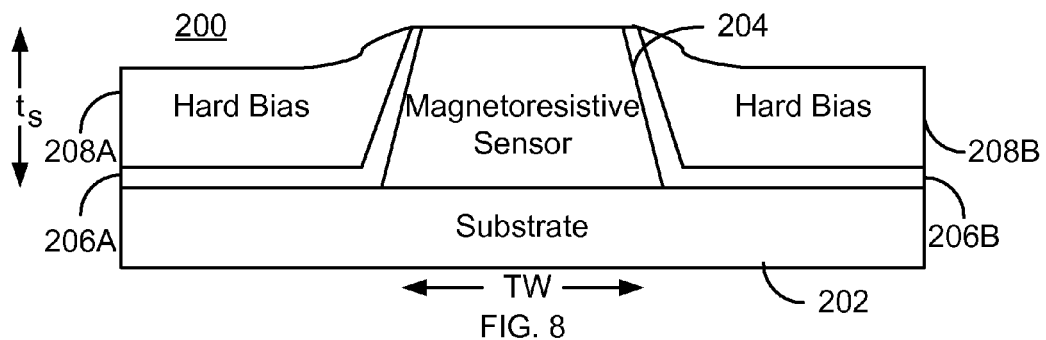

The hard bias material(s) are provided, via step 156. In one embodiment, step 156 includes depositing a material such as CoPt. FIG. 8 depicts the magnetic transducer 200 from the ABS location after step 156 is performed. Thus, hard bias material(s) 208A and 208B are shown. A first portion of the hard bias material(s) 208A/208B are substantially adjacent to the magnetoresistive sensor in the track width direction. Thus, a portion of the insulating layer 206A/206B on the sides of the magnetoresistive sensor 204 may be sandwiched between the hard bias material(s) 208A/208B, respectively, and the magnetoresistive sensor 204.

Figure 9:
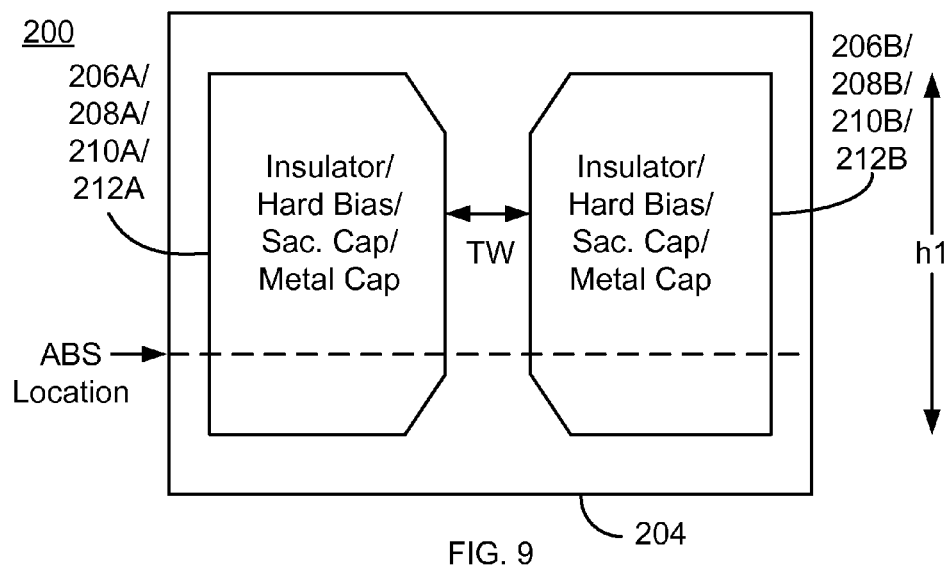
Figure 10:
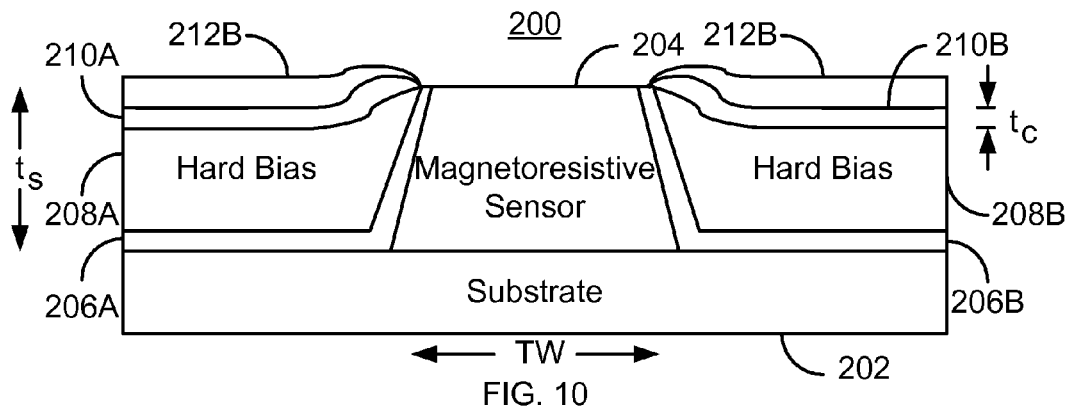

Sacrificial capping layer(s) are provided on at least a portion of the hard bias material(s), via step 158. Step 158 includes depositing materials such as one or more of DLC, aluminum oxide, and silicon carbide. A metallic hard bias capping layer may optionally be on the sacrificial capping layer(s), via step 160. In one embodiment, step 160 may include depositing a layer of Ta. FIGS. 9-10 depict the magnetic transducer after step 160 is performed. FIG. 9 depicts a plan view of the magnetic transducer 200, while FIG. 10 depicts the magnetic transducer from the ABS location, which is indicated in FIG. 9. Thus, FIG. 10 depicts the sacrificial capping layer(s) 210A and 210B and metallic capping layers 212A and 212B. FIG. 9, however, depicts the metallic capping layer 212A/212B, the sacrificial capping layer(s) 210A/210B, the hard bias material(s) 208A/208B, and the insulating layer 206A/206B as overlapping. However, in another embodiment, the sacrificial capping layer(s) 210A/210B, hard bias material(s) 208A/208B, and/or insulating layer 206A/206B may not be coextensive. The sacrificial capping layer(s) 210A/210B provided in step 158 extend a first height, h1, in the stripe height direction, perpendicular to the ABS. The thickness of the sacrificial capping layer(s) 210A/210B is $t_c$.

The sacrificial capping layer(s) 210A/210B are configured such that the hard bias material(s) 208A/208B, respectively, are not completely removed in a subsequent step of defining the stripe height (described below). In one such embodiment, the sacrificial capping layer(s) 210A/210B are configured such that substantially none of the hard bias material(s) 208A/208B are removed during the step of defining the stripe height. In another embodiment, some, but not all, of the hard bias material(s) 208A/208B might be removed during the step of defining the stripe height. Furthermore, the sacrificial capping layer(s) 210A/210B a removal rate in the step of defining the stripe height. In one embodiment, at least the thickness, $t_c$, is set based on the removal rate such that the hard bias material(s) 206A/206B are not removed during the step of defining the stripe height.

Figure 11:
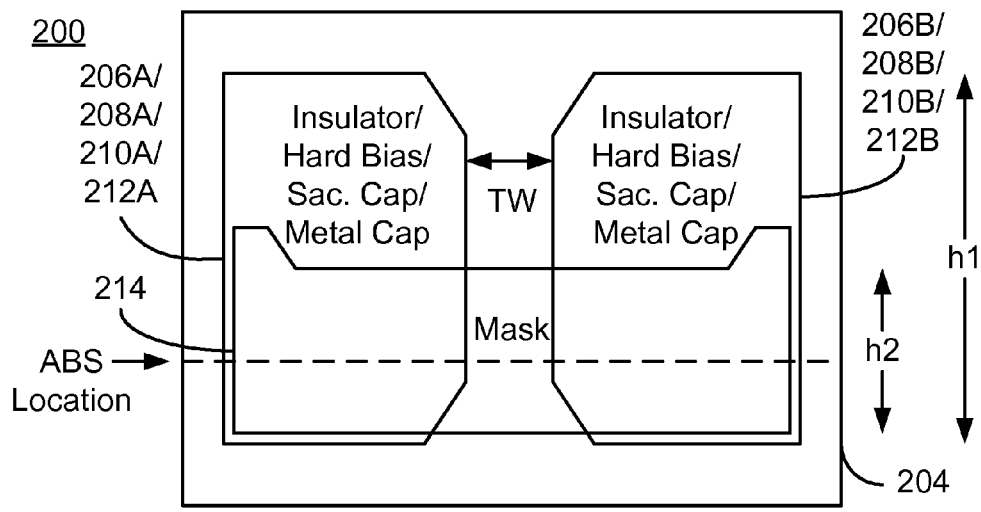
Figure 12:
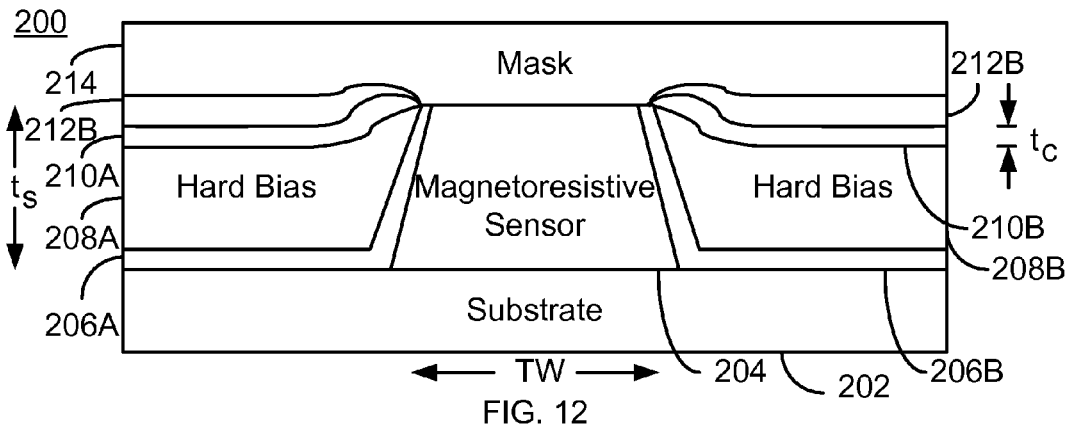

A mask for defining a stripe height of the magnetoresistive sensor in the stripe height direction is provided, via step 162. FIGS. 11 and 12 depict plan and ABS location views of the magnetic transducer 200. Thus, a mask 214 provided in step 162 is shown. In one embodiment, the mask 214 is a photoresist mask. The mask 214 covers a portion of the magnetoresistive sensor 204. The mask may also cover a portion of the hard bias material(s) 208A/208B. In one embodiment, the mask 214 extends in the stripe height direction a second height, h2. The second height, h2, is less than the first height, h1, of the sacrificial capping layer(s) 210A/210B. As can be seen particularly in FIG. 11, the sacrificial capping layer(s) 210A/210B extend farther in the stripe height direction than the mask 214.

Figure 13:
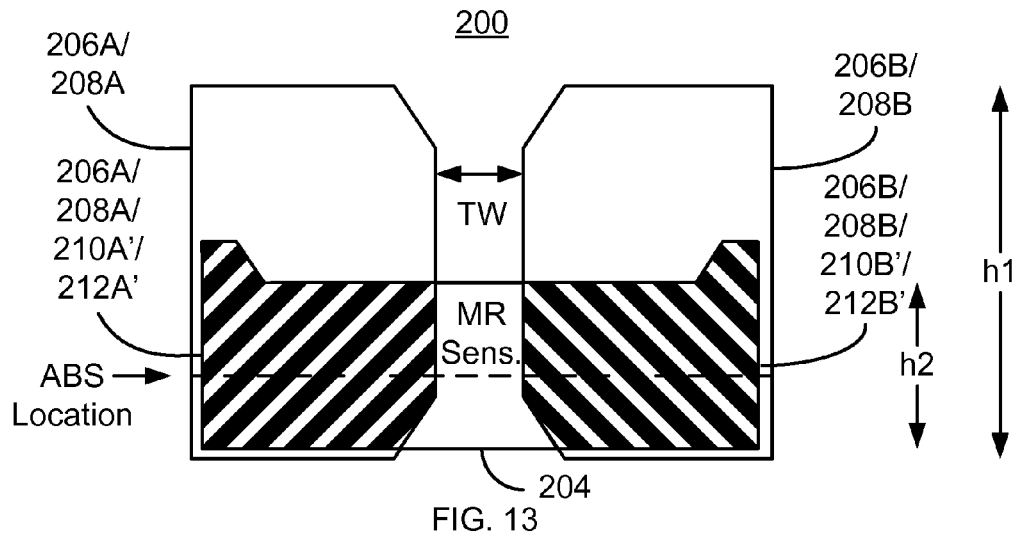

The stripe height of the magnetoresistive sensor 204 is defined while the mask covers at least part of the magnetoresistive sensor, via step 164. In one embodiment, step 164 includes ion milling the magnetic transducer at an angle, for example at least five and not more than twenty degrees. In one such embodiment the angle is at least nine and not more than fifteen degrees. The mask 214 may then be removed and fabrication of the magnetic transducer 200 completed. FIG. 13 depicts a plan view of the magnetic transducer 200 after step 164 is performed and the mask removed. The magnetoresistive sensor 204 thus has a stripe height, h2, that is substantially the same as the mask 214. Note, however, that this stripe height, h2, may differ from the final stripe height of the magnetoresistive sensor 204 in the finished magnetic transducer 200. For example, the final stripe height may be changed by processes such as lapping. In addition, the hard bias material(s) 208A/208B have the height, h1, of the sacrificial capping layer(s) 210A/210B, as deposited. This is because the hard bias material(s) 208A/208B are protected during step 164. However, much or all of the sacrificial capping layer(s) 210A/210B as well as the metallic capping layer(s) 212A/212B have been removed. Only the portion 210A'/210B' of the sacrificial capping layer(s) 210A/210B that were covered by the mask 214 remain. Similarly, only the portions 212A'/212B' of the metallic hard bias capping layer (s) 212A/212B that were covered by the mask 214 remain. For clarity, the portions of the sacrificial capping layers 210A'/210B' and metallic hard bias capping layer(s) 212A'/212B' are shown as cross hatched. These capping layers 212A'/212B' and 210A'/210B' cover portions of the underlying hard bias and insulating layers 208A/208B and 206A/206B, respectively. In subsequent processing, the capping layers 212A'/212B' and the sacrificial capping layers 210A'/210B' may or may not be completely removed.

As discussed above, the sacrificial capping layer(s) 210A/210B are configured to prevent removal of the second portion of the hard bias material(s) 208A/208B during step 164. The magnetoresistive sensor 204 has a first removal rate in step 164, while the sacrificial capping layer(s) 210A/210B have a second removal rate in step 164. In one such embodiment, the sacrificial capping layer thickness, $t_c$, may be greater than or equal to the sensor thickness, $t_s$, multiplied by the first removal rate and divided by the second removal rate. In one embodiment, the second removal rate of the sacrificial capping layer(s) 210A/210B is less than the removal rate for the magnetoresistive sensor 204. In such an embodiment, the thickness of the sacrificial capping layer(s) 210A/210B may be less than the thickness of the magnetoresistive sensor. Further, the thickness of the sacrificial capping layer 210A/210B may be further reduced by accounting for the metallic capping layer 212A/212B being consumed in step 164. Although portions of the capping layers 210A/210B and/or 212A/212B may be consumed, the underlying hard bias material(s) 208A/208B remain.

As discussed above, the sacrificial capping layer(s) 210A/210B allow a portion of the hard bias material(s) 208A/208B exposed by the mask 214 to remain after step 164 is performed. As a result, a hard bias structure 208A/208B that extends past the stripe height h2 may be provided. Biasing of the magnetoresistive sensor 204 and, therefore, signal-to-noise ratio may be improved. This improvement may be achieved without introducing undue perturbations in the processes used for forming the magnetic transducer 200.

Figure 14:
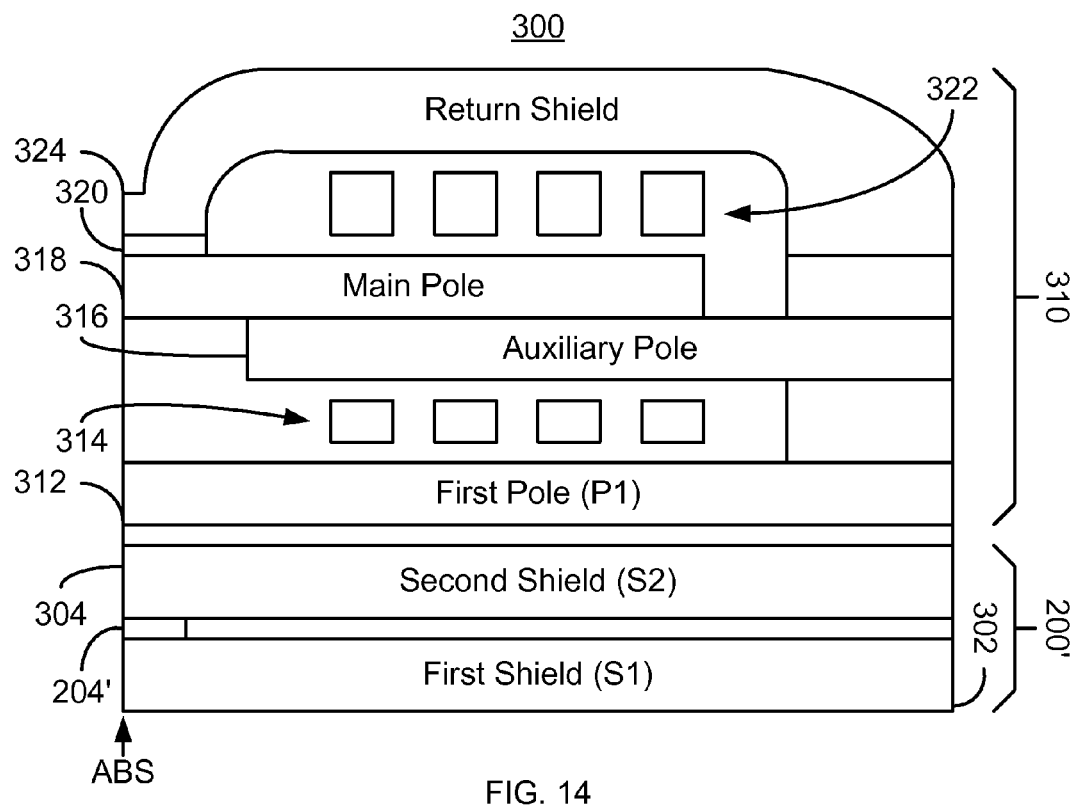
FIG. 14 depicts an exemplary embodiment of a magnetic recording head incorporating a magnetic recording transducer.

FIG. 14 depicts an exemplary embodiment of a magnetic recording head 300 incorporating a magnetic recording transducer. For clarity, the magnetic recording head 300 is not drawn to scale. The magnetic recording head 300 includes a read transducer 200' and a write transducer 310. The read transducer 200' is analogous to the read transducer 200. Consequently, analogous components are labeled similarly. The read transducer 200' includes a read sensor 204' and shields 302 and 304. The read sensor 204' is analogous to the read sensor 204. For clarity, hard bias and other structures are not shown. The magnetic shields 302 and 304 may be composed of a high permeability, soft material, such as NiFe. The write transducer 310 includes a first pole 312, coils 314 and 322, main pole 318, auxiliary pole 316, write gap 320 and return shield 324. In another embodiment, the write transducer 310 may include additional and/or other components.

As discussed above, the sacrificial capping layer(s) (not shown in FIG. 14) allow a portion of the hard bias material(s) (not shown in FIG. 14) exposed by the mask (not shown in FIG. 14) to remain after the stripe height is defined in step 164. As a result, a longer hard bias structure(s) may be provided. Biasing of the magnetoresistive sensor 204' and, therefore, signal-to-noise ratio may be improved. Further, because the biasing of the magnetoresistive sensor 204' is improved, a thinner hard bias structure may be used. As a result, the shield-to-shield spacing between the shields 302 and 304 may be reduced. These improvements may be achieved without introducing undue perturbations in the processes used for forming the magnetic transducer 200'.

We claim:

1. A method for providing a magnetic transducer comprising:
   defining a magnetoresistive sensor in a track width direction;
   providing at least one hard bias material, a first portion of the at least one hard bias material being substantially adjacent to the magnetoresistive sensor in the track width direction;
   providing at least one sacrificial capping layer on a second portion of the at least one hard bias material, the at least one sacrificial capping layer having a first height in a stripe height direction substantially perpendicular to the track width direction, the sacrificial capping layer including an insulating layer, the at least one sacrificial capping layer adjoining the at least one hard bias material;
   providing a mask for defining a stripe height of the magnetoresistive sensor in the stripe height direction, the mask covering at least a portion of the magnetoresistive sensor, the mask having a second height in the stripe height direction, the second height being less than the first height; and
   defining the stripe height of the magnetoresistive sensor while the mask covers the at least the portion of the magnetoresistive sensor, the at least one sacrificial capping layer being configured to prevent removal of the second portion of the at least one hard bias material during the step of defining the stripe height.

2. The method of claim 1 wherein the magnetoresistive sensor has a first removal rate in the step of defining the magnetoresistive sensor, the at least one sacrificial capping layer has a second removal rate in the step of defining the magnetoresistive sensor.

3. The method of claim 2 wherein the magnetoresistive sensor has a first thickness, the at least one sacrificial capping layer has a second thickness, the second thickness being at least the first thickness multiplied by the first removal rate and divided by the second removal rate.

4. The method of claim 2 wherein the second removal rate is less than the first removal rate.

5. The method of claim 1 wherein the at least one sacrificial capping layer is at least one insulating layer including at least one of aluminum oxide, silicon carbide, and diamond-like carbon.

6. The method of claim 1 further comprising:
   providing a metallic capping layer on the at least one sacrificial capping layer.

7. The method of claim 1 wherein the step of defining the stripe height further includes:
performing an ion milling at an angle.

8. The method of claim 1 wherein the magnetoresistive sensor includes at least one side, the method further comprising:
providing an additional insulating layer, a portion of the additional insulating layer residing on the at least one side of the magnetoresistive sensor, the portion of the additional insulating layer being between the magnetoresistive sensor and the first portion of the at least one hard bias material.

9. A method for providing a magnetic transducer comprising:
defining a magnetoresistive sensor in a track width direction, the magnetoresistive sensor including a plurality of sides and having a sensor thickness;
providing an insulating layer, a portion of the insulating layer covering the plurality of sides of the magnetoresistive sensor;
providing at least one hard bias material, the portion of the insulating layer residing between the magnetoresistive sensor and a first portion of the at least one hard bias material in the track width direction;
providing at least one sacrificial capping layer on a second portion of the at least one hard bias material, the at least one sacrificial capping layer being an insulator and having a first height in a stripe height direction substantially perpendicular to the track width direction and a thickness, the at least one sacrificial capping layer adjoining the at least one hard bias material;
providing a metallic hard bias capping layer on the at least one sacrificial capping layer;
providing a mask for defining a stripe height of the magnetoresistive sensor in the stripe height direction, a portion of the mask residing on a portion of the magnetoresistive sensor, the mask having a second height in the stripe height direction, the second height being less than the first height; and
defining the stripe height of the magnetoresistive sensor while the portion of the mask covers the portion of the magnetoresistive sensor, the magnetoresistive sensor having a first removal rate in the step of defining the stripe height, the at least one sacrificial capping layer having a second removal rate in the step of defining the stripe height, the thickness being configured based on the first removal rate, the second removal rate, and the sensor thickness to prevent removal of the second portion of the at least one hard bias material during the step of defining the stripe height.

* * * * *